March 18, 1958 G. R. RACHETER 2,827,276
LAUNDRY DRYER
Filed March 5, 1953 15 Sheets-Sheet 4
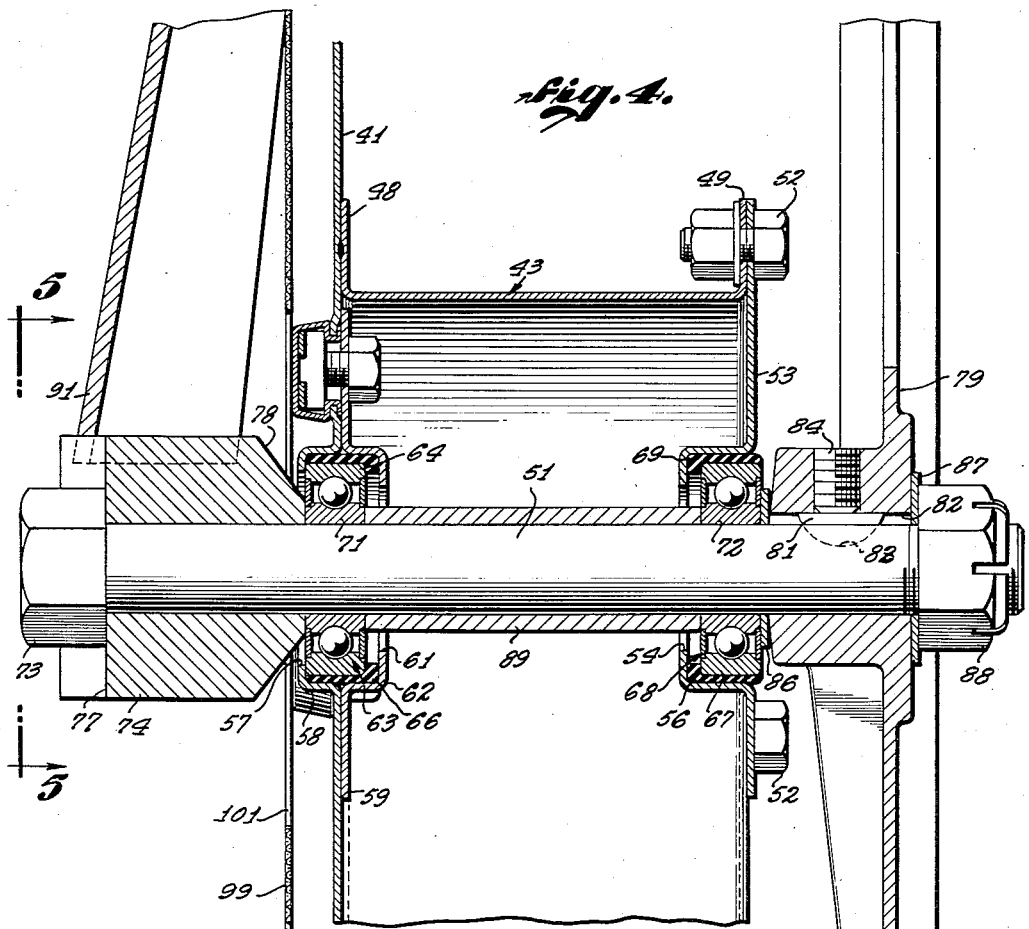
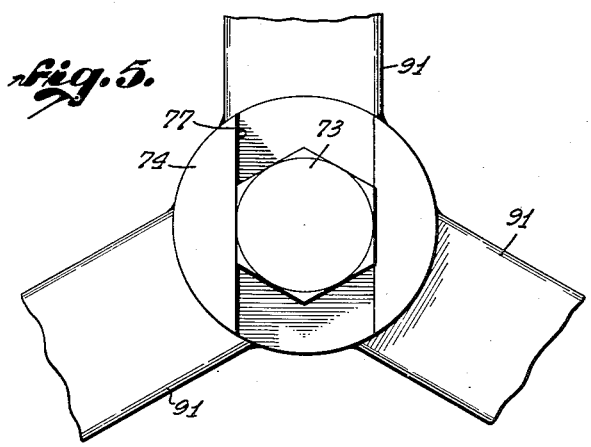
GEORGE R. RACHETER.
*INVENTOR.*
HUEBNER, BEEHLER,
WORREL & HERZIG.
*ATTORNEYS.*
BY
Warren T. Jessup

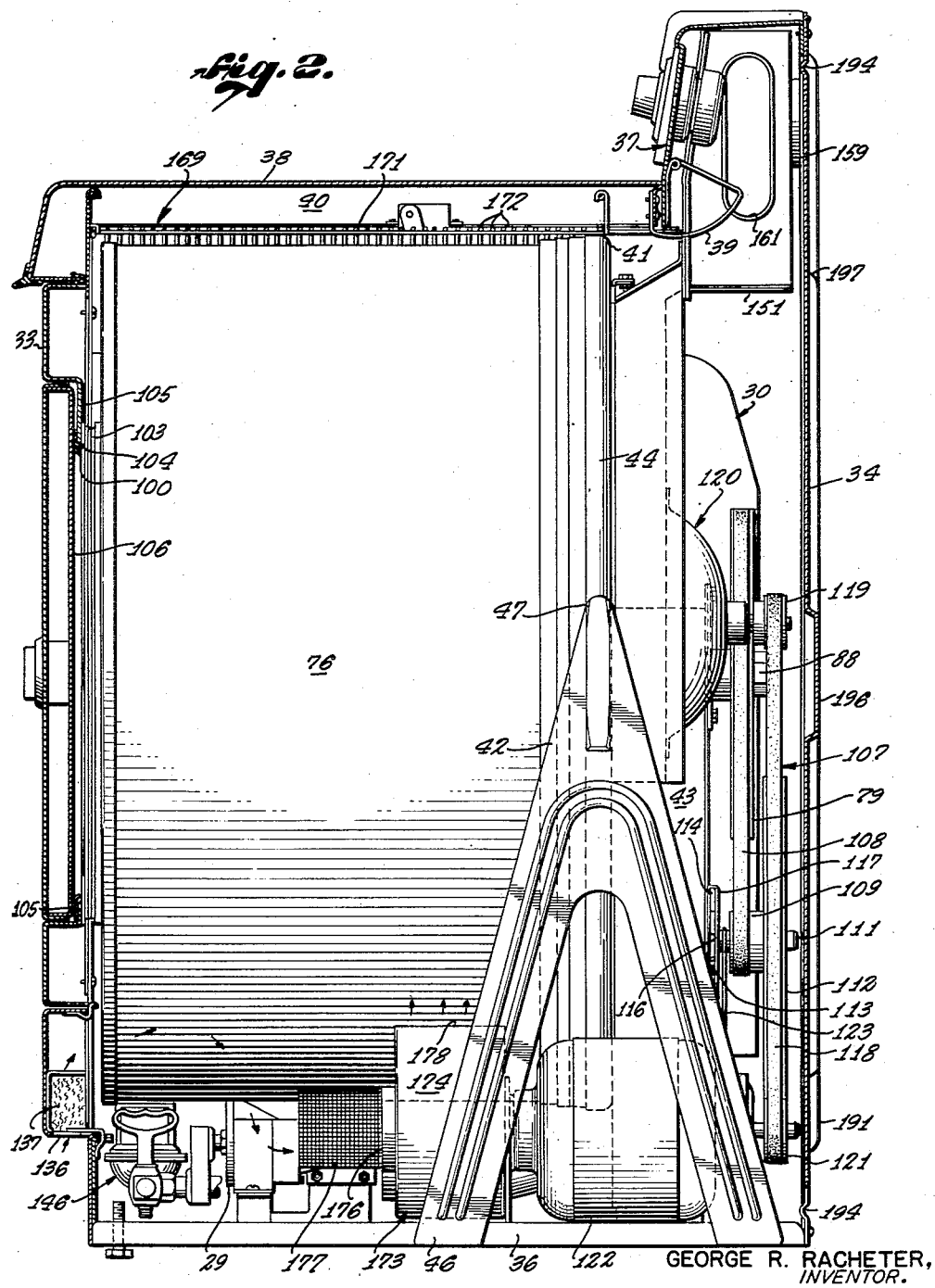

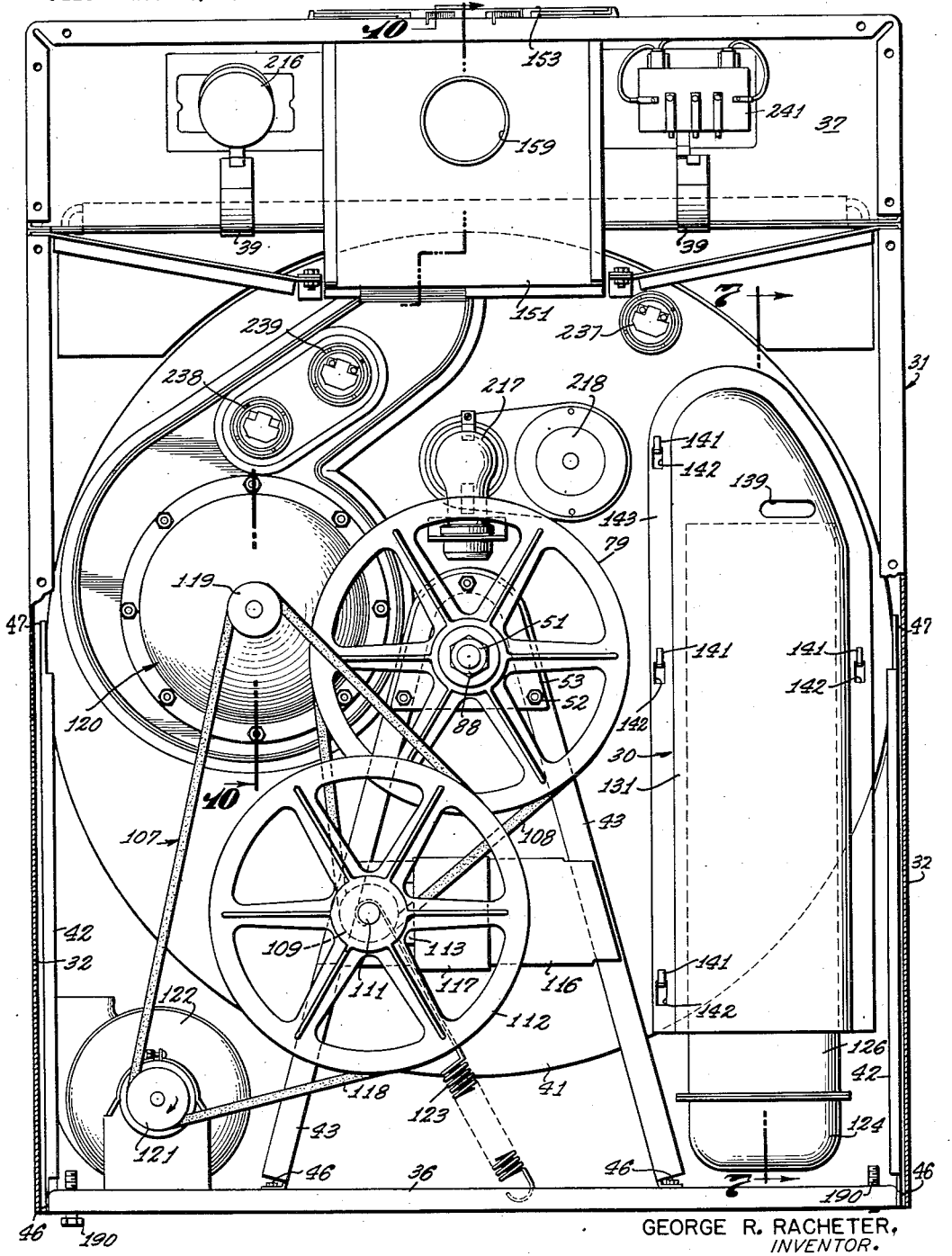

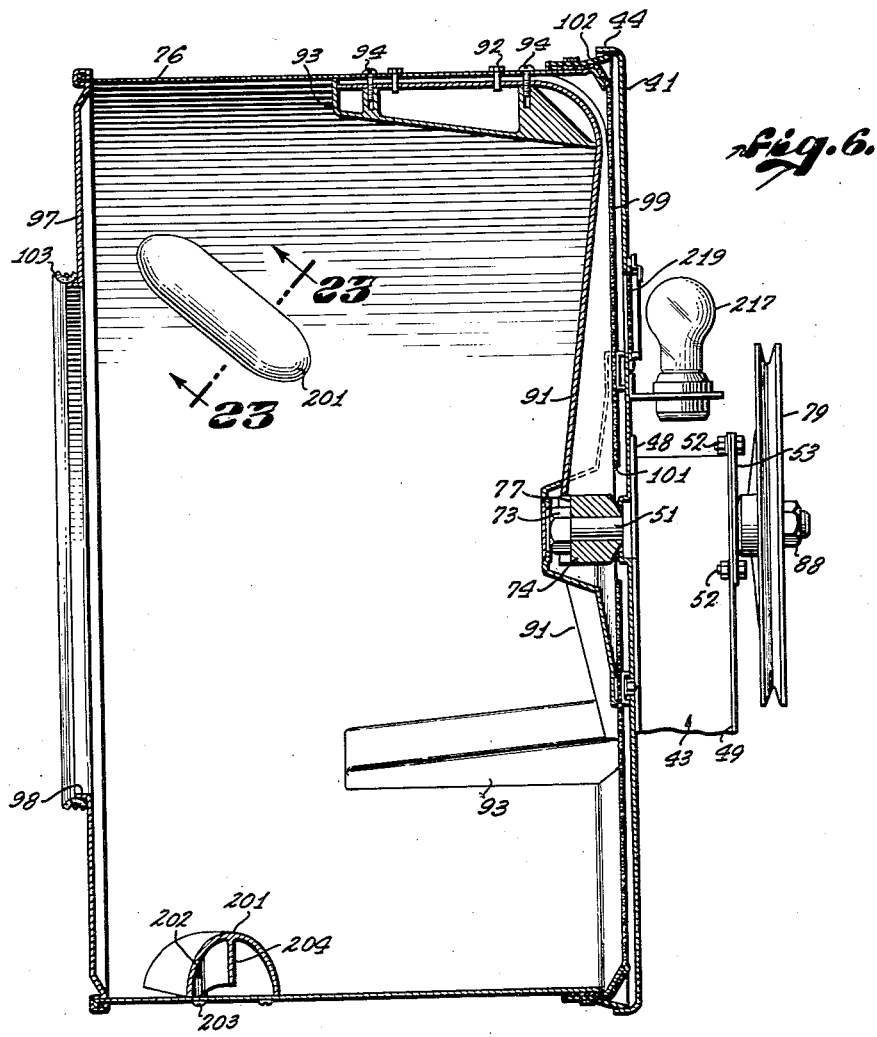
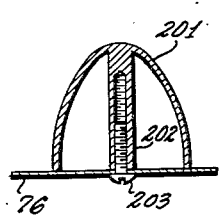

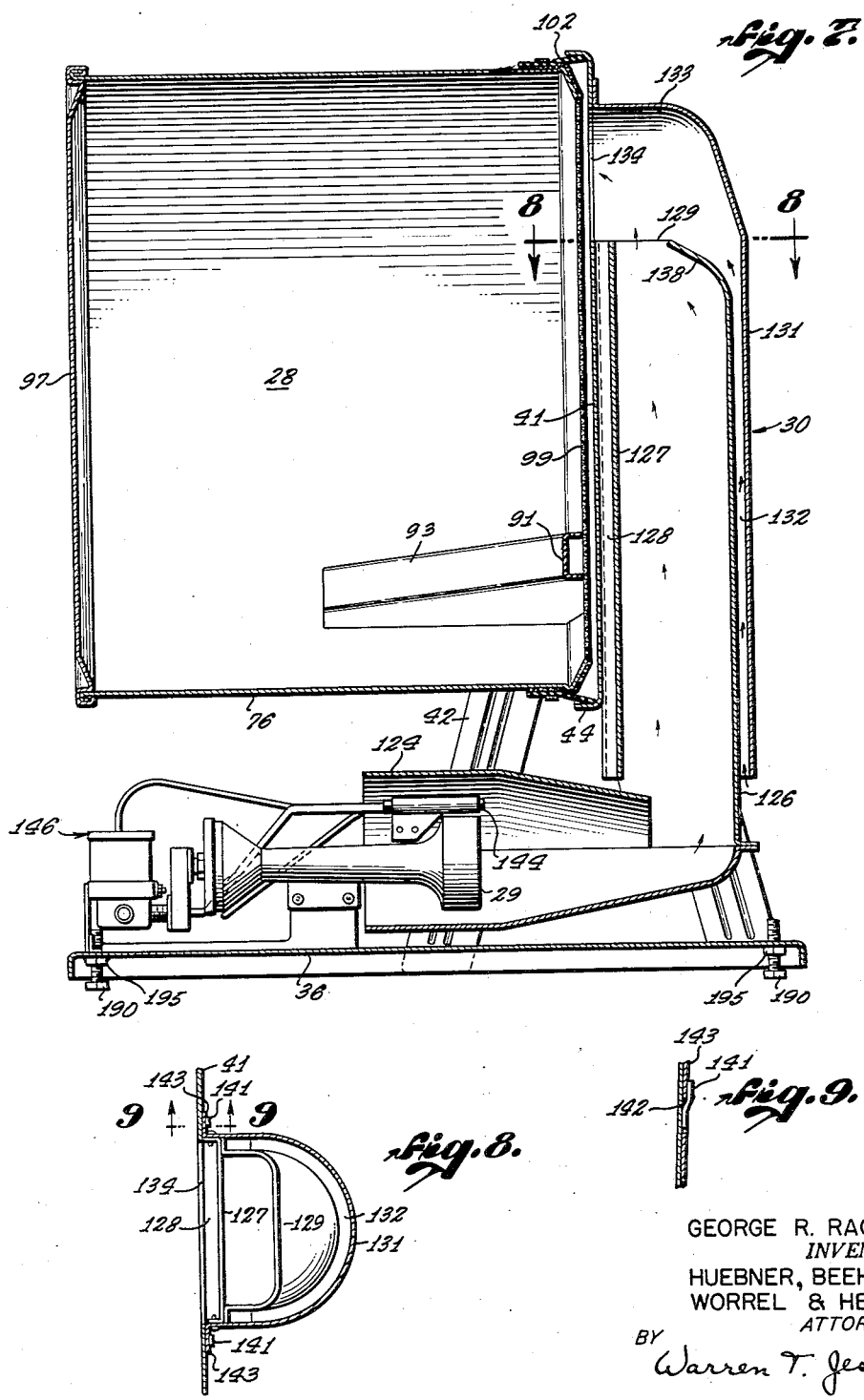

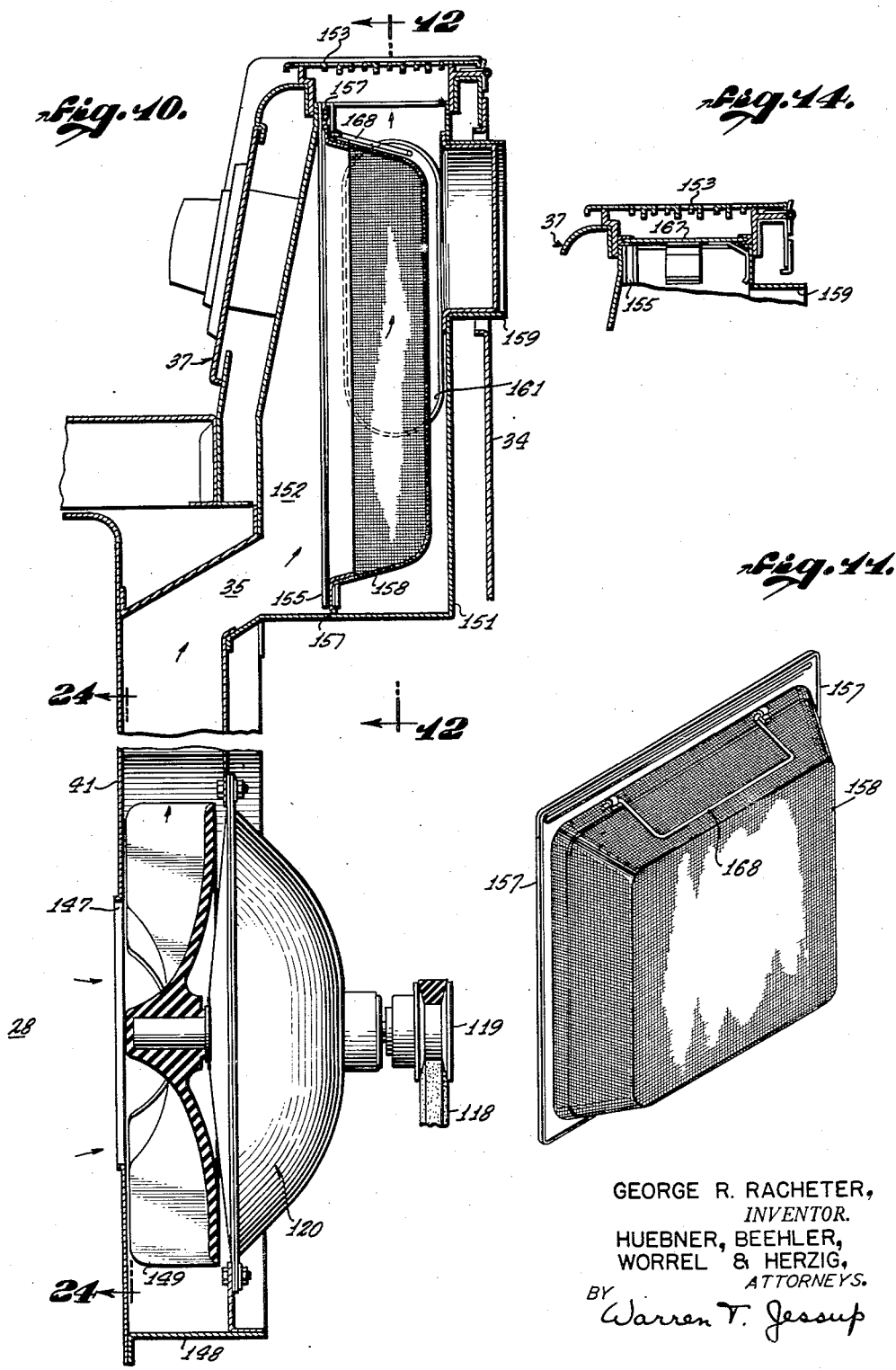

March 18, 1958  G. R. RACHETER  2,827,276
LAUNDRY DRYER
Filed March 5, 1953  15 Sheets-Sheet 8
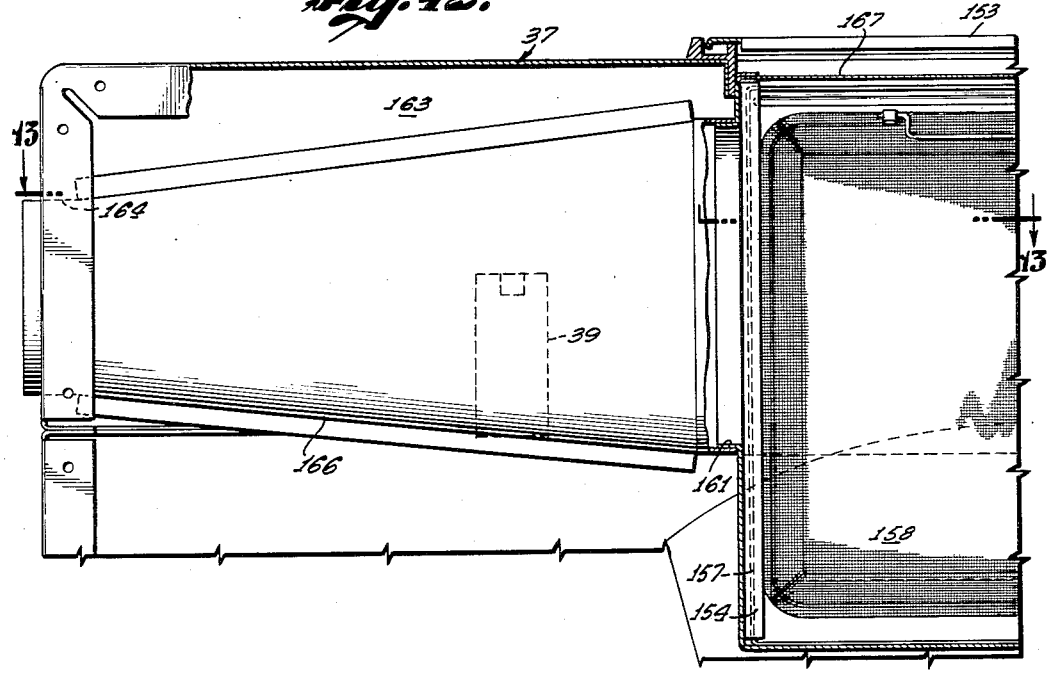
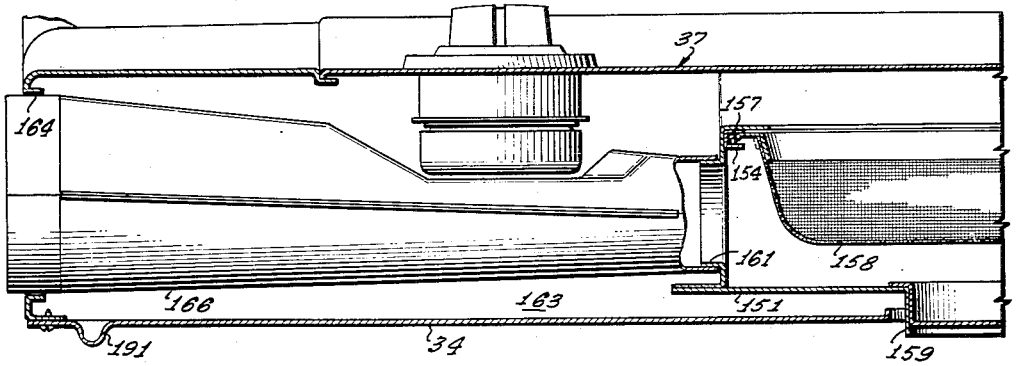
GEORGE R. RACHETER,
INVENTOR.
HUEBNER, BEEHLER,
WORREL & HERZIG,
ATTORNEYS.
BY Warren T. Jessup March 18, 1958 G. R. RACHETER 2,827,276
LAUNDRY DRYER
Filed March 5, 1953 15 Sheets-Sheet 9

GEORGE R. RACHETER,
INVENTOR.

HUEBNER, BEEHLER,
WORREL & HERZIG,
ATTORNEYS.
BY
Warren T. Jessup

March 18, 1958 G. R. RACHETER 2,827,276
LAUNDRY DRYER
Filed March 5, 1953 15 Sheets-Sheet 10
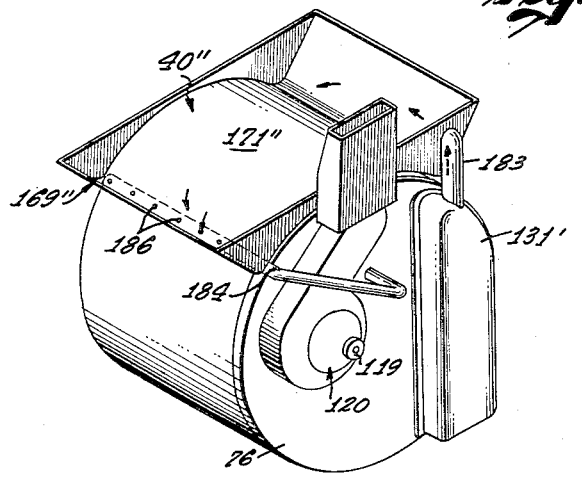
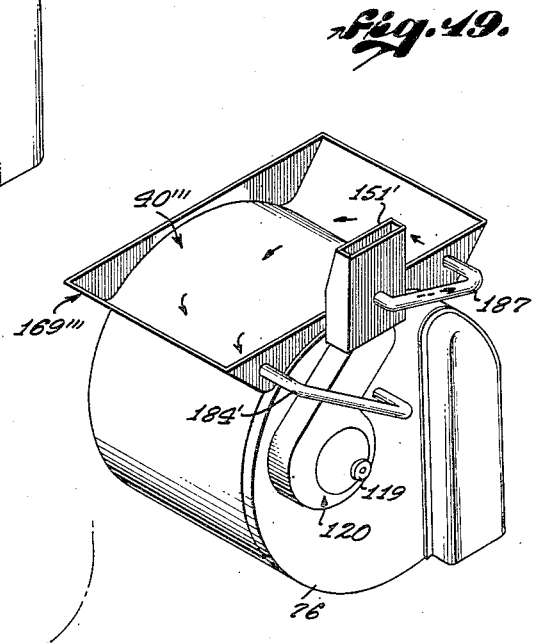
GEORGE R. RACHETER,
INVENTOR.
HUEBNER, BEEHLER,
WORREL & HERZIG,
ATTORNEYS.
BY Warren T. Jessup March 18, 1958     G. R. RACHETER     2,827,276
LAUNDRY DRYER Filed March 5, 1953     15 Sheets-Sheet 11

GEORGE R. RACHETER,
*INVENTOR.*
HUEBNER, BEEHLER,
WORREL & HERZIG,
*ATTORNEYS.*
BY Warren T. Jessup

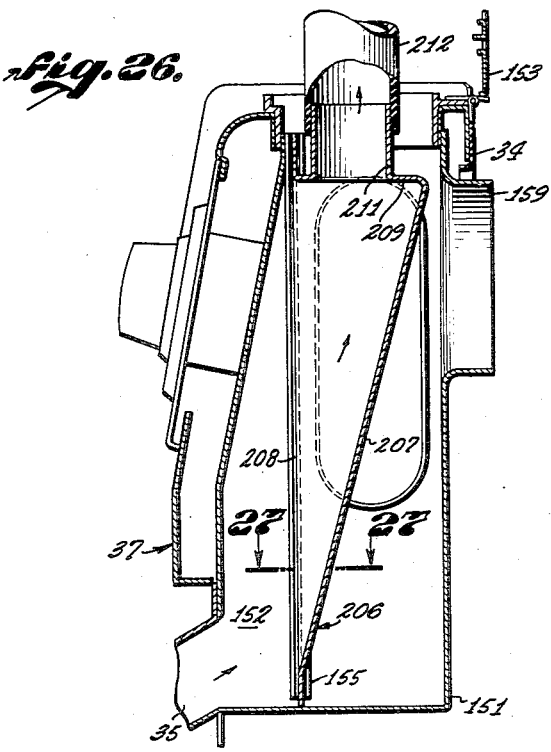
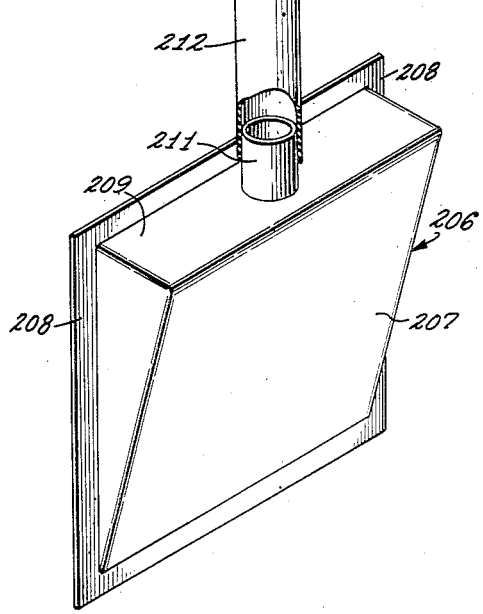
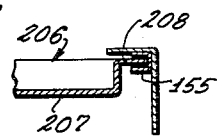

March 18, 1958  G. R. RACHETER  2,827,276
LAUNDRY DRYER
Filed March 5, 1953  15 Sheets-Sheet 13
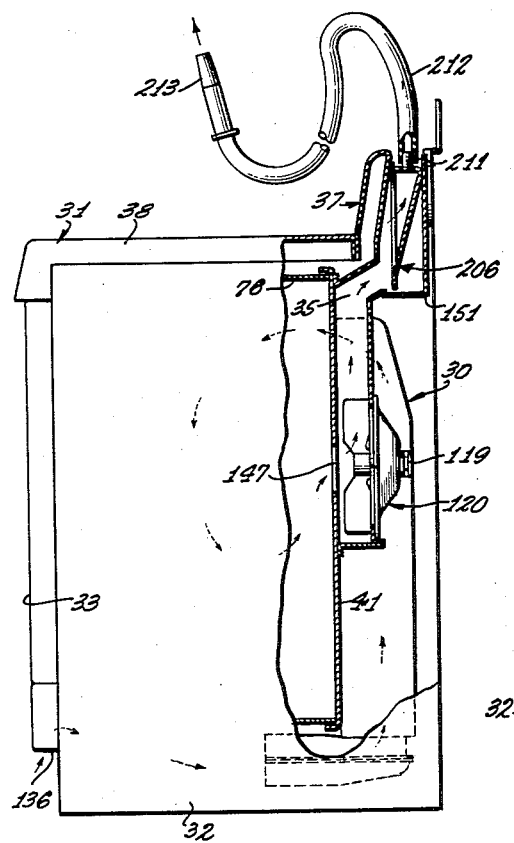
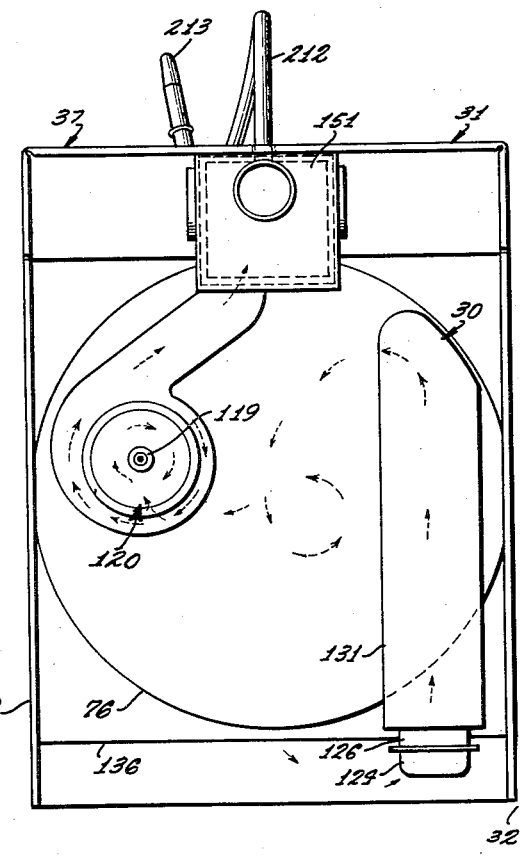
GEORGE R. RACHETER,
INVENTOR.
HUEBNER, BEEHLER,
WORREL & HERZIG,
ATTORNEYS.

March 18, 1958     G. R. RACHETER     2,827,276
LAUNDRY DRYER
Filed March 5, 1953     15 Sheets-Sheet 14

GEORGE R. RACHETER,
INVENTOR.
HUEBNER, BEEHLER,
WORREL & HERZIG,
ATTORNEYS.
BY Warren T. Jessup

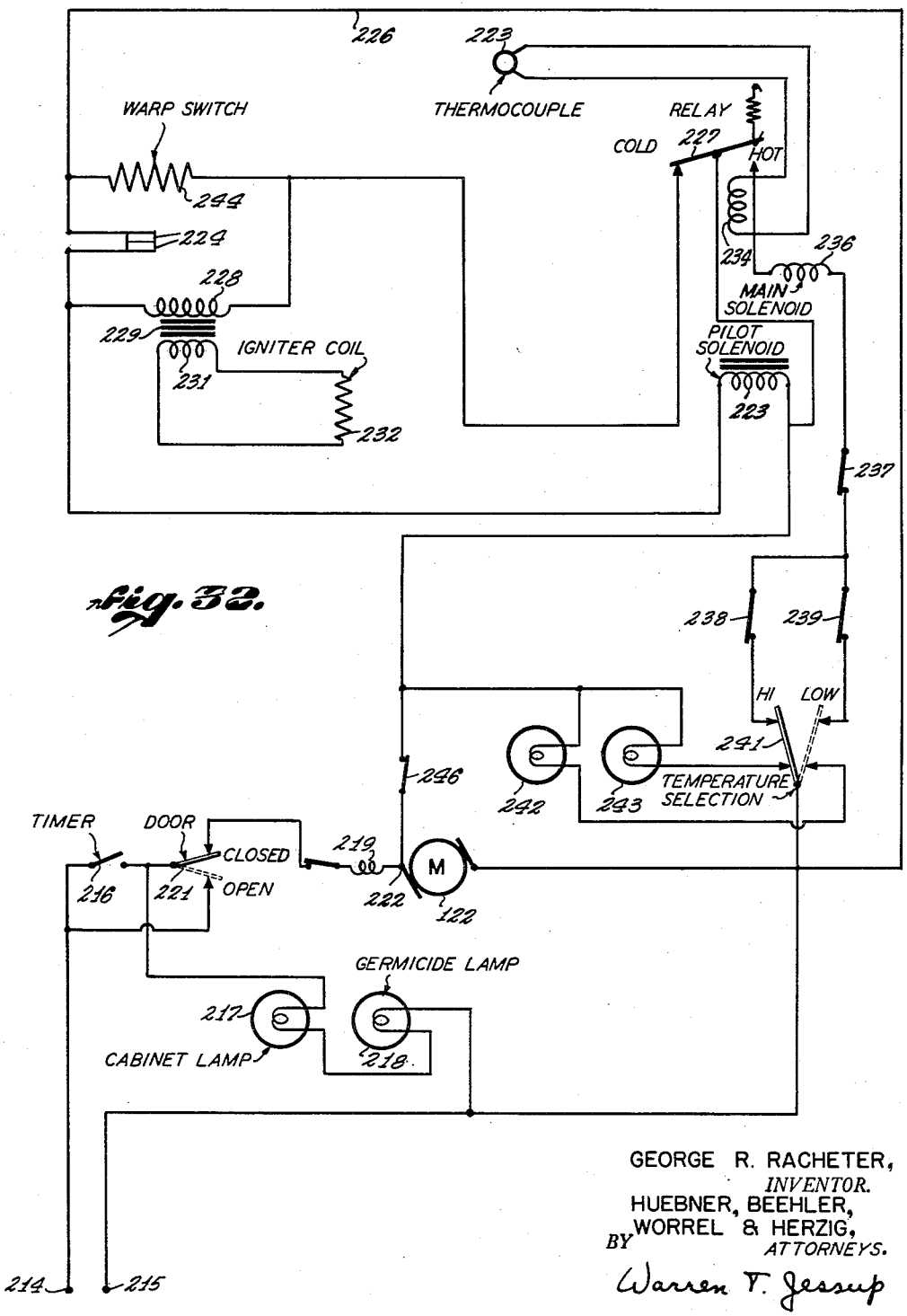

United States Patent Office 2,827,276
Patented Mar. 18, 1958

2,827,276

LAUNDRY DRYER

George R. Racheter, Los Angeles, Calif., assignor to Rheem Manufacturing Company, Richmond, Calif., a corporation of California Application March 5, 1953, Serial No. 340,551

8 Claims. (Cl. 263—33)

This invention relates to household type clothes dryers.

It is an object of this invention to provide an improved household clothes dryer.

One type of household clothes dryer now popular in this country includes a housing wherein there is a drying chamber, often in the form of a rotating tumbler. Hot gases are passed into the drying chamber and are then evacuated therefrom and discharged from the housing, thus removing the moisture from clothing placed in the tumbler. The hot gases thus passed through the drying chamber are often too hot for some delicate fabrics, such as silk and woolen articles; as a result such articles must be dried by other means.

It is an object of the present invention to provide auxiliary means in a clothes dryer, capable of drying fabrics at a relatively low temperature, thereby preventing harm to such fabrics.

It is another object of the present invention to provide auxiliary drying means in a clothes dryer, capable of drying delicate fabrics without tumbling or otherwise physically agitating such fabrics.

It is another object of this invention to provide, in a clothes dryer, a secondary drying chamber, which operates at a lower temperature than the normal or primary drying chamber (generally comprising the tumbler), which secondary chamber is capable of accepting fine fabrics to be dried at a relatively low temperature.

It is a further object of this invention to provide such a secondary drying chamber as above, without enlarging the normal size of the clothes dryer, by making use of normally unused regions within the housing of the dryer.

It is a further object of this invention to provide means for circulating warm air through a secondary drying chamber as described above, without the use of a special heat source.

It is another object of this invention to provide a secondary drying chamber as above, in which warm air is circulated without the requirement of additional motive power to circulate the warm air.

Household clothes dryers of present day design are generally provided with an orthogonal cabinet or housing, and are adapted to be placed with the back of the dryer flush against the wall of the room in which the dryer is located. Since considerable heat emanates from the dryer, even apart from the hot moist gas which is discharged therefrom, a problem arises in keeping the adjacent room wall at a low enough temperature to meet safety standards. It is accordingly an object of this invention to provide means for keeping the room wall against which the dryer is backed at a sufficiently low temperature so that danger from fire is minimized.

It is another object of this invention to keep the room wall down to an acceptable temperature by employing the natural discharge of moist hot gases from the dryer to induce a flow of cooling air between the back of the dryer and the room wall.

The conventional use for household clothes dryers of the type here under discussion is for the drying of clean, damp clothes after they have been removed from a washing machine. It is therefore desirable that the hot air which is flowed past the moist clothes be clean, so that it will not soil the clothes in its passage therethrough. It is therefore an object of this invention to provide means for filtering the room air which enters the dryer and which eventually is passed through the drying chamber, whereby the clothes in the dryer are not made dirty by the passage of the hot drying air.

When a household clothes dryer is installed in a room, a number of situations or problems may be presented with respect to venting the hot moist gases from the dryer. Where the dryer is installed in a house under construction, it is sometimes preferable to provide a venting conduit inside the room wall itself, in which case it is desirable that the gases should be discharged rearwardly from the back of the dryer directly into the wall and then up the conduit inside the wall. Where the dryer is installed in a house already built, it may be desirable that the gases be vented sidewardly at the rear of the dryer, so that they may be then directed into a conduit which goes up into the ceiling within the room or into a side wall or in some cases even downwardly through the floor. In still other situations the householder may decide not to vent the hot moist gases outside of the room at all, but allow them merely to be discharged into the room and naturally dissipated. In this case, it is desirable that the gases should be vented upwardly at the rear of the dryer cabinet. It is accordingly an object of this invention to provide means whereby the discharged gases may be vented optionally either rearwardly of the dryer, to either side of the dryer, or directly upward at the rear of the dryer.

In order that the clothes may be properly and continuously mixed up in the drying chamber or tumbler, it is another object of this invention to provide special tumbling means of unique configuration mounted within the tumbler which more effectively tumbles or mixes up the clothes within the dryer, so that more even drying thereof is obtained.

It is still another object of this invention to provide special tumbling means within the tumbler, which effectively tumbles the clothes while reducing or minimizing the wear on the clothes by virtue of such tumbling.

For years women have been confronted with the often vexing problem of satisfactorily drying their generally copious locks after they have washed their hair. Modern industry has provided special hair drying machines which give forth a blast of warm or hot air which the user may direct against her tresses to thereby dry the same following a scalpal lavation. Such drying equipment is, however, quite expensive compared to the relative infrequency of its use, and therefore cannot be afforded by most households. It is therefore another object of this invention to provide inexpensive and convenient means for readily adapting a clothes dryer so that it may be employed optionally as a hair dryer.

It is a further object of this invention to provide a simple accessory for a clothes dryer which may be quickly applied to the clothes dryer to render it serviceable as a hair dryer.

In clothes dryers of present day popularity, it is conventional to provide a back frame or plate to which is mounted in cantilever fashion the rotating tumbler that constitutes the drying chamber of the clothes dryer. This rotatable cantilever mounting of the tumbler or drum necessitates the use of two bearings spaced apart along the tumber shaft, in order to accommodate the considerable bending moments occasioned by the cantilever mounting of the tumbler. In order to employ ball bearings as the two bearings mentioned above, it is of course necessary to insure that the tumbler shaft is secured reasonably well to the inner races of the ball bearings. The conventional practice of press fitting the shaft within the inner races produces great problems in aligning the two bearings, particularly when the shaft is to be removed and replaced after construction of the clothes dryer, as would be the case where it might be necessary to replace the bearings following several years of use of the dryer. It is accordingly an object of this invention to provide a bearing structure for a cantilever mounted drying tumbler which provides for ready and easy removal and replacement of the bearing shaft and the associated ball bearings.

It is another object to provide such a bearing structure in which the tumbler shaft need not be press fitted tightly into the inner races of the aligned ball bearings in order to insure a satisfactory clamping of the inner race to the shaft.

Clothes dryers of the type here under consideration generally employ an air blower or impeller to evacuate the hot gases from the drying chamber and discharge them to the vent. Such blowers often produce an objectionable hum or whine due, it is believed, to air vibrations set up at the tip of the impeller blades. It is an object of this invention to eliminate or substantially decrease this tip hum of the air blower.

In a gas-fired clothes dryer, the source of heat is generally comprised of a gas burner, the hot gases or products of combustion from which are conveyed by suitable hot gas conduit means to the drying chamber. Such hot gases are usually at a temperature somewhat more elevated than would be preferable for the drying of most moist fabrics in the drying chamber. It is therefore advantageous to cool the hot gases somewhat before they are permitted to flow into the drying chamber. It is therefore an object of this invention to provide means for cooling the gases from the burner before they enter the drying chamber.

It is another object of this invention to effect such cooling as above by providing suitable means for mixing the hot gases from the burner with ambient room air, which serves not only to cool the gases but also provides a greater volume of air entering the drying chamber, thereby producing a greater total gas flow and consequent more rapid removal of moisture from the moist clothes in the drying chamber.

In accordance with these and with other objects which will become apparent hereinafter, several embodiments of the instant invention will now be described with particular reference to the accompanying drawings wherein:

Fig. 1 is a front elevational view of the dryer with the front panel or wall removed;

Fig. 2 is an elevational view taken from the right side of the dryer with the side panel or wall cut away;

Fig. 3 is an elevation taken from the rear of the dryer with the back wall or plate removed;

Fig. 5 is a fragmentary view taken from line 5—5 of Fig. 4;

Fig. 6 is a sectional elevation taken centrally of the rotating tumbler, showing particularly the baffle or tumbling members forming a feature of the instant invention;

Fig. 7 is an elevational section taken on line 7—7 of Fig. 3;

Fig. 8 is a fragmentary cross section taken on line 8—2 of Fig. 7;

Fig. 9 is a fragmentary section taken on line 9—9 of Fig. 8;

Fig. 10 is a fragmentary section taken along line 10—10 of Fig. 3;

Fig. 11 is a perspective view showing the screen basket for intercepting solid materials, such as lint, discharged from the drier;

Fig. 12 is a sectional view taken on line 12—12 of Fig. 10;

Fig. 13 is a sectional plan view taken on line 13—13 of Fig. 12;

Fig. 14 is a fragmentary view generally similar to the upper portion of Fig. 10, showing an optionally employable closure plate for the discharge of the dryer;

Fig. 18 is a view similar to Fig. 17 of a second modified form of secondary drying chamber;

Fig. 19 is a view similar to Fig. 17 of a third modified form of secondary drying chamber;

Fig. 23 is a fragmentary view of one of the tumbling members taken on line 23—23 of Fig. 6;

Fig. 24 is a schematic view taken on line 24—24 of Fig. 10, and illustrates particularly the configuration of the impeller eye or inlet opening;

Fig. 25 is a perspective view of an optionally employable hair drying accessory;

Fig. 26 is a fragmentary section, similar to Fig. 10, showing the hair drying accessory of Fig. 25, mounted in the dryer;

Fig. 27 is a fragmentary sectional plan taken on line 27—27 of Fig. 25;

Figs. 28 and 29 are, respectively, side and rear views showing the hot gas passage through the dryer, and showing particularly employment of the hair drying attachment in connection with the dryer;

Figure 4:
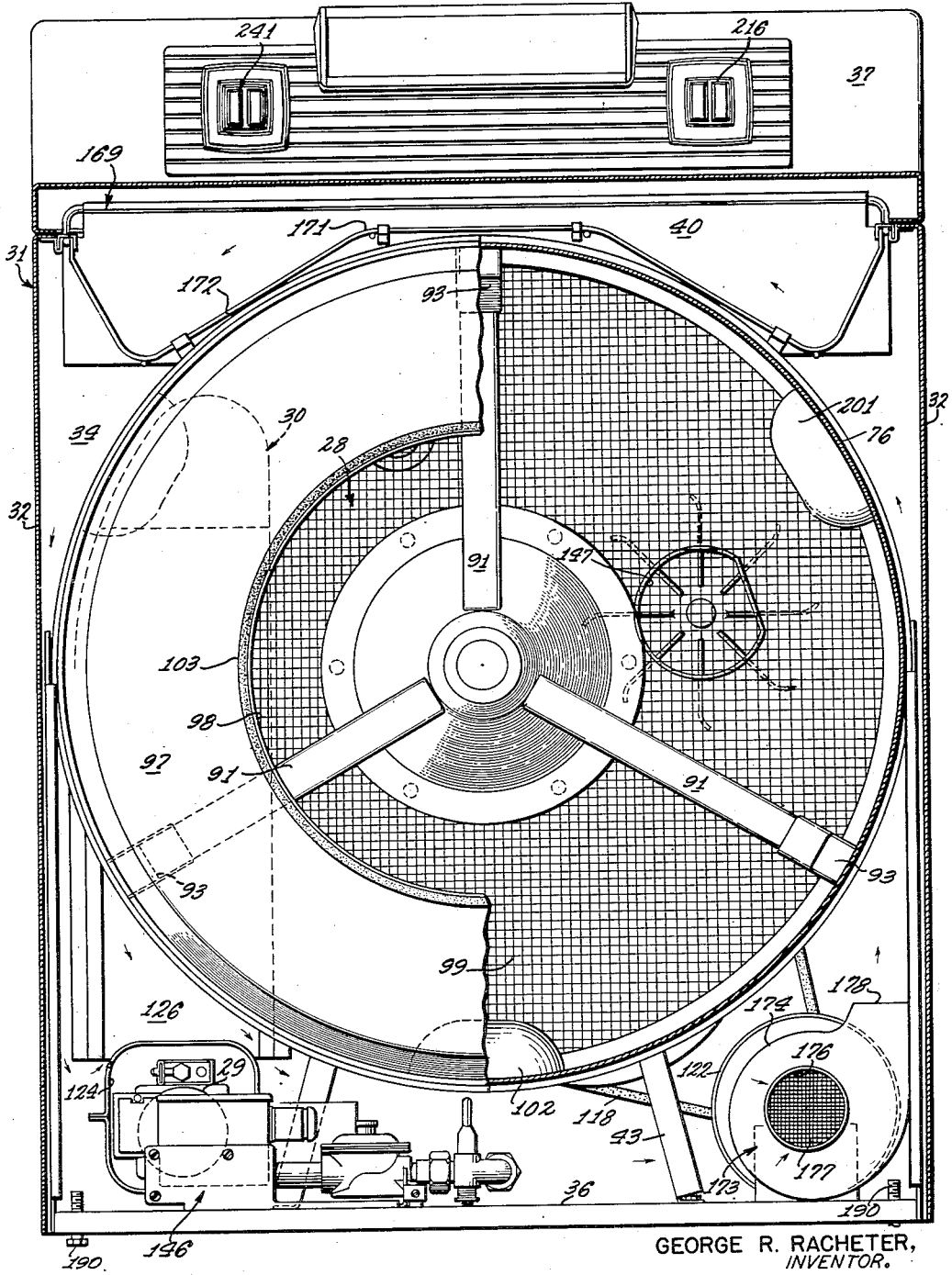
Fig. 4 is a fragmentary sectional elevation taken on line 4—4 in Fig. 3 showing the bearing structure for the cantilever mounting of the tumbler.

Figs. 30 and 31 are views of an alternative arrangement whereby the dryer may be heated electrically rather than by gas; Fig. 30 being a sectional side elevation generally similar to Fig. 7 but showing the electrical modification, and Fig. 31 being a fragmentary rear elevation generally similar to Fig. 3, showing the electrical modification; and Fig. 32 is a wiring diagram showing the circuitry involved in the clothes dryer.

Referring to the drawings, the basic major components of the instant clothes dryer are a housing 31; a primary drying chamber 28 in the form of a rotatable tumbler 76; a heating means in the form of a gas burner 29; hot gas passage or conduit means 30 to convey heated gases from the heating means 29 to the drying chamber 28; discharge conduit or passage means 35 for evacuating the gases from the drying chamber 28 and discharging the same outside of the housing 31; a secondary drying chamber 40 for drying delicate fabrics at a lower temperature than that in the primary drying chamber 28, and without tumbling or agitating the clothes as in the tumbler 76; and means for effecting passage of warm gases through the secondary drying chamber 40.

Referring particularly to Figs. 1, 2, and 3, 31 designates a substantially orthogonal housing including side walls 32, a front wall 33, a back wall or plate 34, and a base 36. The dryer is adapted to be installed with its back 34 against a room wall. Extending across the back or rear of the housing 31, at the top thereof, is an elongate venting and splash guard structure 37. The housing 31 is accessible from the top by virtue of a top 38 hinged along the rear edge thereof to the forward edge of the splash guard structure 37 by means of a pair of arcuate hinge members 39.

Fixedly mounted within the housing 31 parallel to, and spaced forwardly from, the rear wall 34 is a circular bulkhead 41. The bulkhead 41 is mounted in the housing 31 by means of a pair of side mounting frames 42, each in the form of an inverted V, and by a back mounting frame 43 also in the form of an inverted V. The bulkhead 41 has a flange 44 extending forwardly therearound. The lower ends of the legs of the three V frames 42 and 43 are secured to the base 36 by welding or bolting, as shown at 46. The bulkhead 41 is secured as by welding at each side to the respective upper ends or vertexes 47 of the side frames 42. The V frame 43 is formed with substantial width in a direction normal to the back wall 34, as shown in Fig. 4, and the edges thereof are turned to form side flanges 48 and 49 lying in spaced planes paralleling the back wall 34. The flange 48 is spot welded at several points to the contiguous bulkhead 41, thereby giving firm support to the bulkhead and to the parts carried thereby.

Tumbler mounting

Slightly below the apex of the V frame 43 is a shaft 51 disposed on an axis normal to the back wall 34. Secured to the frame flange 49 by means of bolts 52, and adjacent the vertex of the V, is a shaft mounting plate 53. The plate 53 has a hole or opening 54 therein and is embossed forwardly or inwardly circumjacent the hole to form a recess 56. Aligned with the hole 54 is a hole or opening 57 in the bulkhead 41, circumjacent which the bulkhead is embossed forwardly, as shown at 58. Another mounting plate 59 is secured to the bulkhead 41 and has an opening 61 aligned with the openings 57 and 54. The plate 59 is embossed rearwardly, as shown at 62, and the two portions 58 and 62 form a recess for a ball bearing 63. The outer race 64 of the ball bearing 63 is press-fitted firmly within this recess through the intermediacy of a pliant or resilient (e. g. rubber) fitting ring 66. The outer race 67 of another ball bearing 68, aligned with the ball bearing 63, is press-fitted into the recess 56 through the intermediacy of another pliant or resilient fitting ring 69. The shaft 51 passes through the inner races 71 and 72 of the respective ball bearings 63 and 68 and through the openings 57, 61, and 54. Thus the bulkhead 41, together with the attached plate 59, constitues one of a pair of opposed, horizontally spaced bearing supports for the shaft 51, the other support being the plate 53.

The shaft 51 is conveniently formed of a large bolt, the head 73 of which is disposed forwardly in the dryer, i. e., to the left in Fig. 4. To the head end of the shaft 51 is mounted the hub 74 of a circular tumbler 76 (Fig. 6), the interior of which constitutes the primary drying chamber 28. The hub 74 is keyed to the shaft 51 by the formation of a groove 77 in the face of the hub, into which fits the hexagonal head 73 (Fig. 5).

The opposite, rear face of the hub 74 is chamfered, as shown at 78, to clear the edges of the bulkhead 41 around the opening 57, so that only a narrow annular portion of the hub 74 bears against the inner race 71.

To the other (rear) end of the shaft 51 is mounted a pulley 79, which is keyed thereto by the provision of a semi-circular key 81 residing in a keyway 82 in the hub of the pulley 79 and in a corresponding keyway 83 in the shaft 51. A set screw 84 serves to further clamp the key 81 in place. The hub of the pulley 79 bears against the inner race 72 through the intermediacy of a washer 86. On the other side of the pulley is a washer 87 against which bears a nut 88 threaded onto the end of the shaft 51.

In accordance with the instant invention the shaft 51, instead of being press-fitted within the inner races 71 and 72, is made of such diameter that it may slide freely into the inner races. This greatly simplifies mounting problems, particularly when the bearings 63 and 68 are to be replaced after the dryer has been used for some time. Such mounting problems are particularly acute in a press fit where aligned bearings are encountered, as in the present instance.

With this loose fit, however, means must be provided to assure that the shaft 51 does not turn freely within the inner races 71 and 72, for in that case the purpose of the ball bearings would be defeated. To this end a sleeve 89 is provided immediately circumjacent the shaft 51 extending between the inner races 71 and 72. When the nut 88 is tightened, the inner race 71 is clamped longitudinally between the hub 74 and the left end of the sleeve 89, while the inner race 72 is clamped longitudinally between the right end of the sleeve 89 and the pulley 79 (through the intermediacy of the washer 86). As the nut 88 is drawn up, the pliancy or resiliency of the fitting rings 66 and 69 permits the bearings 63 and 67 to come into true alignment. Since the hub 74 and pulley 79 are keyed to the shaft 51, the races 71 and 72 are in turn assured of being sufficiently well clamped to the shaft 51 through the longitudinal frictional engagement described above. Thus with this mounting arrangement, including the sleeve 89, circumferential frictional engagement between the shaft 51 and the inner races 71 and 72 is not required, and the installation problems, such as the aligning problem, inherent in a press fit between shaft and inner races are obviated. This mounting arrangement also obviates any necessity for removing the tumbler 76 to change bearings, which operation would require complete dismantling of the forward face of the dryer. Bearings are changed merely by unscrewing the nut 88, pulling the bolt 51 forwardly from the interior of the tumbler 76, and then resting the tumbler 76 on the floor of the housing while the bearings 63 and 68 are replaced from the back of the housing. Reinstallation of the tumbler involves simply a reversal of these steps.

Referring now to Fig. 6, three radial ribs 91 are welded to the hub 74 and extend to the outer periphery of the drum or tumbler 76 where they turn forwardly and are secured to the drum as shown at 92. Overlying the securement at 92 are three baffle members 93, which are secured from the exterior of the tumbler by bolts 94. The members 93 serve to assist in tumbling the clothes about in the primary drying chamber 28, and also to cover up the rib securement at 92 so that clothes will not be snagged thereon. The ribs 91 form a structural skeleton giving support to the tumbler 76, which extends forwardly beyond the ends of the ribs 91 and terminates in a forward edge 96, to which is secured a tumbler front wall 97 having a circular central opening 98 therein, by means of which clothes are placed in the drying chamber 28.

The back or rear wall of the tumbler 76 is constituted of a heavy perforate screen 99 having a central circular opening 101 therein to accommodate passage of the hub 74. Around the rear edge of the tumbler 76 is secured a band 102 of felt, which bears radially outward and rubs on the inside of the flange 44 of the bulkhead 41.

Around the central opening 98 in the front wall 97 is mounted a felt ring 103. This ring presses pliantly against a recessed flanged portion 105 of the front wall 33 of the housing 31, and immediately circumjacent a circular opening 104 formed in the recessed portion 105. The opening 104 is in turn closed by a door 106 hinged to the front wall 33, which bears against a rubber seal 100 mounted around the rim of the opening 104.

Thus the drying chamber 28 is substantially sealed against ingress or egress of gases except through the screen 99, which is in turn covered by the bulkhead 41. Entrance and exit is therefore through certain openings in the bulkhead 41, to be described hereinafter.

The pulley 79 is rotated, to in turn rotate the tumbler 76, by a belt means, shown generally at 107 in Fig. 3. This belt means includes a belt 108 riding on the pulley 79, which is driven by a small pulley 109 (Fig. 2) mounted on a stub shaft 111, to the outer end of which is mounted a large, idler pulley 112. The pulleys 109 and 112 constitute floating idler pulleys. The shaft 111 is secured to a plate 113 which rides loosely in a slot 114 formed between a cross brace 116 spanning the legs of the frame 43, and a metal loop 117 secured to the cross brace 116.

The pulley means 107 also includes a second belt 118 riding in the pulley 112, and also spanning the drive pulley 119 of a primary blower 120, and the rear pulley 121 of an electric drive motor 122 mounted to the base 36. A tension spring 123 extends between the stub shaft 111 and the base 36, and, in cooperation with the floating mounting of the stub shaft 111, tends to keep the belts 108 and 118 tight.

When electric energy is applied to the motor 122, its shaft is caused to turn clockwise as viewed from the rear (Fig. 3). This rotation, geared down by the pulley means 107, is transmitted to the tumbler shaft 51, causing the tumbler 76 to rotate. Simultaneously, the primary blower 120 is caused to operate at a speed approximately 40% higher than that of the motor, since the pulley diameter 119 is approximately 40% smaller than that of the pulley 121.

*Gas passage*

Hot air for drying damp clothes in the drying chamber 28 is provided by a heating means in the form of a gas burner 29 (Fig. 7). The burner 29 is mounted at the entrance of a horizontal combustion conduit 124, and burns with its flame directed to the right in Fig. 7. Products of combustion and ambient air flowing therewith are directed from the conduit 124 into the bottom of a vertical conduit 126 forming part of the hot gas passage means 30. The vertical conduit 126 is generally semi-cylindrical in form, being constituted by an elongate vertical plate 127 secured to, and spaced from, the bulkhead 41 to which plate is secured as by welding, the semi-cylindrical portion of the conduit shown at 126. By spacing the plate 127 from the bulkhead 41, a flat vertical channel 128 is formed, in which ambient air may be drawn upwardly by the discharge of hot gases from the open upper end 129 of the vertical conduit 126.

The hot gas passage means 30 also includes a generally semi-cylindrical shell 131 surrounding or embracing the semi-cylindrical portion 126 and spaced therefrom to leave an annular vertical channel 132 in which additional ambient air may be drawn in upwardly around the conduit 126.

The top of the shell 131 is closed by being brought over to the bulkhead 41 at a point spaced above the upper end 129, as shown at 133. Between the top of the shell 133 and the upper end 129 of the conduit 126, an aperture 134 is formed in the bulkhead 41, by means of which the hot gas passage means 30 communicates laterally with the primary drying chamber 28.

Ambient and combustion air for the burner 29 enter the housing 31 through a horizontal, elongate air inlet passage or opening 136 (Fig. 2) formed lengthwise along the front of the housing near the bottom thereof. Athwart this passage is an elongate filter 137, which serves to strain out dirt and dust from the air entering the housing 31. From the interior of the housing 31 air is drawn into the combustion tube 124 by the suction created by the blower 120 and by the burning of the burner 29. Hot gases pass up the vertical conduit 126 and then flow laterally through the opening 134 and screen 99 to the interior of the tumbler 76.

The upper edge of the conduit 126 is bent inwardly, as shown at 138, to form an angular restriction tending to deflect the rising hot gases toward the lateral communication 134 with the tumbler 76. As the hot gases emerge upwardly from the opening at 129, they tend to draw ambient air upwardly through the channels 128 and 132. This ambient air, mixing with the hot gases in the shell 131 above the conduit 126, serves to lower the temperature of the hot gases before they enter the primary drying chamber 28, and also to add to the volume of air flow. This is generally desirable, since the temperature of the hot gases is usually somewhat higher than is to be desired for most fabrics in the drying chamber. Thus the ambient air effects a greater volume at lower temperature, which is to be desired for rapid and safe drying of clothing in the tumbler.

In practice, it has been found desirable to admit additional ambient air through an elliptical or elongate hole or port 139 formed in the shell 131 slightly above the upper end 129 of the inner conduit 126.

It is preferred to secure the shell 131 to the bulkhead 41 by welding small upstanding tabs 141 (Figs. 3 and 9) to the bulkhead, which hook into holes 142 formed in a flange 143 around the periphery of the shell 131.

The burner 29 is provided with the usual pilot burner 144 and with the customary controls 146 which are electrically operated, as will be described hereinafter in conjunction with Figs. 29.

*Venting structure*

The hot gases entering the drying chamber 28 through the opening 134 in the bulkhead 41 serve to dry the clothes in the chamber by removing moisture therefrom; and the warm, moisture-laden air is then removed from the chamber 28 through an opening 147 (Figs. 1 and 10) formed in the bulkhead 41. The opening 147 communicates with, and thus forms the eye or inlet for the housing 148 of the primary air blower 120, which has an impeller 149 that tends to draw the air in through the opening 147 and force it upwardly through the discharge conduit or passage means 35.

The discharge conduit means 35 extends upwardly toward the center of the venting or splash guard structure 37, and terminates in an upwardly directed conduit or vent box 151, forming an outlet chamber 152. The vent box 151 occupies the central portion of the splash guard structure 37, and is open at the top except for a grill 153 hinged at the rear to the splash guard structure 37. Within the vent box 151, at the sides thereof, are mounted vertical opposed channel members 154 and 155 (Figs. 12 and 13). These channels receive the side flanges 157 of a screen basket 158, which is slid in place downwardly into the vent box 151. The basket 158 thus lies athwart the discharge conduit means 35 and intercepts lint and other solid material withdrawn from the drying chamber 28. The hot moist gases thus filtered of solid material then exit through the grill 153 into the room in which the dryer is installed.

It may be desirable to vent the dryer to the exterior of the dwelling, rather than to let the moist gases emerge into the room. To this end other openings beside the top opening are provided in the vent box 151. There is a circular opening at the rear around which is secured a rearwardly extending collar 159. There are also oblong openings 161 at each side of the vent box 151. These openings communicate with venting regions 163 formed at each side within the venting structure 37. The side walls of the venting structure 37 are also provided with openings 164. Optionally employable side conduits 166 communicate between the openings 161 and 164, if it is desired to discharge the dryer gases to the side.

In this manner four alternative venting arrangements are possible. If the dryer is being installed in a house under construction, it is often desirable to provide for dryer venting by installing within the house wall, a conduit which emerges from the wall at the level of the collar 159. In this way the dryer vents rearwardly directly into the room wall. In this event only the opening 159 is open, the openings 161 and 164 being closed by suitable closure plates. The upper open portion of the vent box 151 is also closed by a suitable closure plate 167 (Fig. 14) positioned beneath the grill 153.

If it is desired to vent the dryer to the right-hand side of the splash guard structure 37, then all openings are closed except the right-hand openings 161 and 164, and between these openings is mounted the auxiliary side conduit 166 which conveys the vented hot gases to the right side of the splash guard structure 37 and out the opening 164. From here it is vented by suitable external conduits in any desired direction.

In a similar manner the same conduit 166 may be placed at the left-hand opening 161 to vent the dryer to the left.

In case external venting is not desired, the openings 159, 161, and 164 are closed by their closure plates, and the moist warm air is allowed to emerge directly upward through the grill 153.

It is necessary that the screen basket 158 be removed periodically so that the collected lint may be emptied therefrom. To this end a wire handle 168 is hinged to the top of the basket 158 to permit the basket to be more readily slid upward and removed from the vent box 151. For this purpose the grill 153 is hinged backward to give access to the top of the box 151.

Where external venting to the rear or to the sides is employed, the basket 158 may or may not be employed. If it is employed, it is only necessary on each emptying thereof to also remove the closure 167.

From the structure described thus far, it will be seen that air drawn into the housing 31 through the filter 137 by the suction created by the blower 120 and by the burning of the burner 29, is heated and passed upwardly into the tumbler 76 from whence it is evacuated by the action of the primary blower 120, which impels it upwardly in the discharge conduit 35 into the outlet chamber 152. From the chamber 152 it is vented through one of the four optional venting passages described hereinbefore.

*Secondary drying chamber*

It is desirable that certain delicate fabrics be dried at a temperature lower than that which can be readily attained in the primary chamber 28 with normal burning at the burner 29. It is also desirable under certain circumstances that this lower temperature drying be effected without tumbling or otherwise agitating the clothes, which is unduly destructive and wearing on certain fabrics. To this end there is provided, in accordance with this invention, a stationary secondary drying chamber 40. This chamber is located above the tumbler 76, beneath the hinged top 38, and makes use of the segmental areas within the housing 31 at each side of the tumbler 76, which are normally unused. The hinged top 38 constitutes an access means by which articles to be dried may be deposited in, and removed from, the secondary drying chamber 40.

In order to support articles in the secondary chamber 40 a tray 169 (Fig. 15) is disposed in the housing 31 immediately above the tumbler 76. The floor 171 of the tray is formed of a plurality of parallel rods 172, the space between the rods constituting perforations by means of which warm air may be passed into, and removed from, the secondary drying chamber 40. The floor 171 also thus constitutes a partition means defining the secondary drying chamber 40, this partition means having passage means for the entrance and exit of warm drying air. It will be noted that the floor 171 is depressed into the two segmental areas of the housing 31 at each side of the tumbler.

Figure 15:
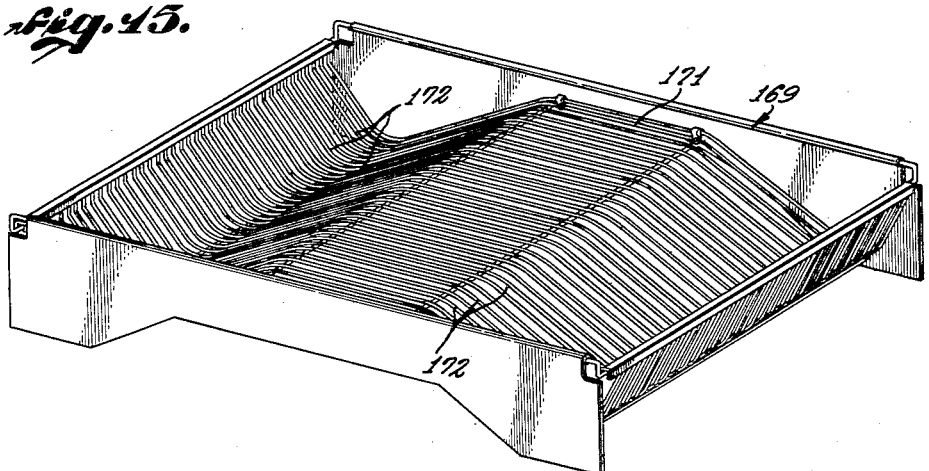
Fig. 15 is a perspective view of the tray which is mounted in the upper portion of the dryer above the tumbler, and which forms the secondary drying chamber for delicate fabrics.

In the embodiment shown in Figs. 1 and 15, warm air is circulated through the secondary drying chamber 40 by means of a secondary blower 173 (Figs. 1 and 2). The blower 173 comprises a scroll casing 174 secured to the frame of the motor 122 forwardly thereof. In certain cases where noise from the motor 122 is excessive, it is preferred to mount the casing 174 to the base 36 by means of rubber mounting pads, instead of to the motor 122. The casing 174 has a forward axial inlet 176 which is screened by a cylindrical screen 177; and a tangential outlet 178 pointed upwardly in a direction substantially tangential to the exterior cylindrical surface of the tumbler 76. As will be best seen in Fig. 1, there is thus created within the housing 31 an impelling means for keeping the air in the housing, external of the tumbler 76, constantly circulating around the outside of the tumbler, and through the secondary drying chamber 40. This secondary circulating air derives its heat, principally by wall conduction, from the tumbler 76, from the hot gas passage means including the conduits 124 and 126, and from the discharge conduit 35. The moisture removed from the clothing in the tray 169 finds its way into the combustion conduit 124 and is thence discharged from the housing under the impetus of the primary blower 120.

It will be seen that two drying chambers 28 and 40, having appreciably different temperatures, have been provided—one for drying rugged fabrics, and the other for drying delicate fabrics that are unable to stand the elevated temperature and tumbling action of the primary drying chamber 28.

Figure 16:
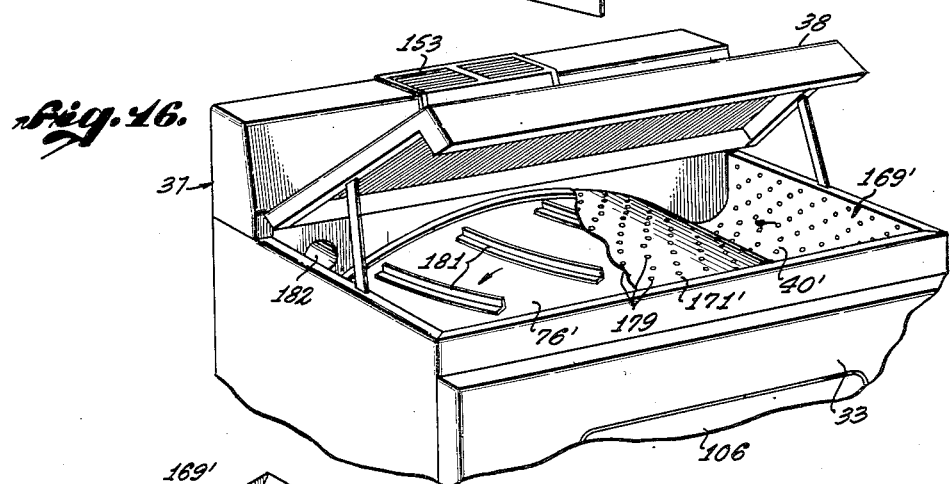
Figs. 16 and 17 are views of a first modified form of secondary drying chamber.
Figure 17:
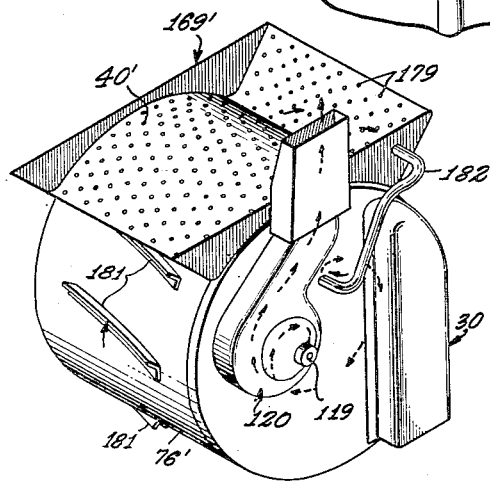

The tray 169 may be constructed in various ways, and various means may be used for passing warm air therethrough. A first modified form of tray is shown in Figs. 16 and 17. Here the perforations in the floor 171' of the tray 169', instead of being comprised of elongate openings between rods 172, as in Fig. 15, are formed as a series of holes 179 formed in an otherwise solid sheet of material. Also in this modified form, instead of impelling the secondary air by a blower such as shown at 173 in Fig. 1, the air is passed through the secondary drying chamber 40' by two impelling means. The first means consists of vanes 181 mounted on the cylindrical exterior periphery of the tumbler 76'. These vanes tend to cause the ambient air within the housing 31' to circulate around the tumbler 76' and through the secondary drying chamber 40'. The second means consists of a conduit 182, extending from a side wall of the chamber 40' down to a convenient opening in the bulkhead 41. Thus the primary and secondary chambers are placed in communication, and the vacuum created in the primary chamber by the primary blower 120 serves to augment passage of warm air through the secondary drying chamber 40'.

In Fig. 18 a second modified form of drying chamber 40" is shown consisting of a substantially solid floor 171" to which warm air is admitted by a bypass conduit 183 extending from the top of the hot gas passage shell 131' to one corner of the secondary chamber 40". Air is withdrawn from the secondary chamber 40" to the primary drying chamber through a conduit 184 in substantially the same manner as shown in Fig. 17, except that the conduit 184 extends beneath one side of the tray 169" and communicates therewith through a series of aligned communicating openings 186.

In Fig. 19 a third modified form of secondary drying chamber 40''' is shown wherein warm air is admitted to the secondary chamber from the outlet chamber 152 by means of a conduit 187 leading from the vent box 151' to the tray 169'''. The warm gas is evacuated from the secondary chamber, which has a substantially imperforate floor, by a conduit 184' communicating through a side wall of the tray 169'''.

*Wall cooling*

As mentioned hereinbefore, it is generally the most convenient practice to install clothes dryers with their backs substantially flush against the wall of a room, such as a kitchen or service room. Because of the considerable heat engendered within the dryer housing 31, the room wall immediately behind the dryer becomes quite warm, and care must be taken to assure that it does not become a fire hazard.

Figure 20:
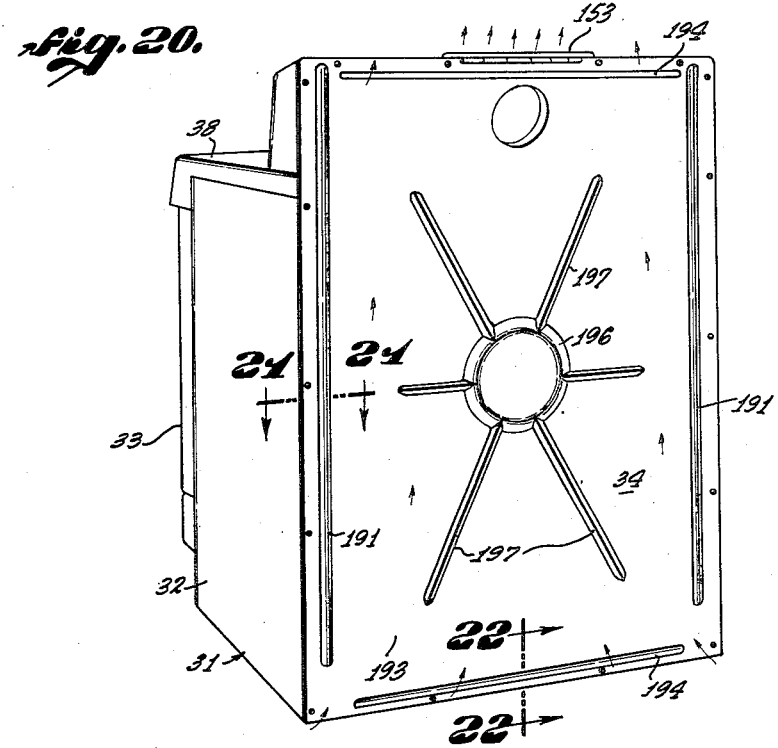
Fig. 20 is a rear view of the dryer showing particularly the configuration of the back wall or plate.
Figure 21:
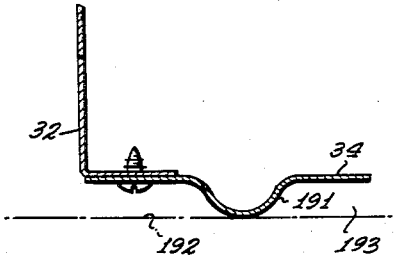
Fig. 21 is a fragmentary sectional plan taken on line 21—21 of Fig. 20.
Figure 22:
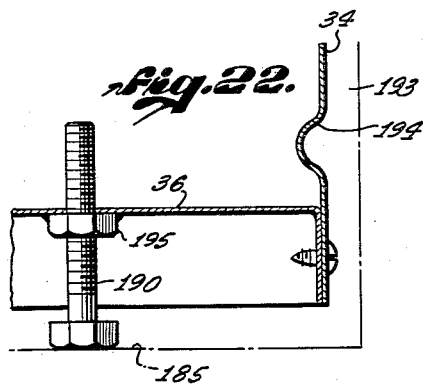
Fig. 22 is a fragmentary sectional elevation taken on line 22—22 of Fig. 20.

In accordance with the instant invention, means are provided for inducing a constant flow of ambient room air upwardly in the narrow space between the back of the dryer and the room wall. As shown in Fig. 20, the back wall or plate 34 of the housing 31 is provided with a pair of vertical, outwardly embossed ridges 191 on opposite sides of the wall. These ridges serve to space the wall 34 proper slightly away from the room wall 192 (Fig. 21), thereby leaving a flat narrow channel or vertical passage 193 between the room wall 192 and the back plate 34. Furthermore, the base 36 is spaced above the room floor 185, by four small legs in the form of bolts 190, the heads of which rest on the floor 185, and the shank portions of which are threaded into the base 36, strengthened by weld nuts 195. When venting through the grill 153 is employed, there is an up draft created immediately adjacent the upper end of this vertical passage 193, which induces a draft of cooling ambient air under the base 36 and also sidewardly under the lower ends of the ridges 191. This up draft serves to assist in carrying off heat which might otherwise be transmitted from the back plate 34 to the room wall 192. To this end it will be noted that the ridges 191 terminate an appreciable distance above the bottom of the dryer.

The ridges 191 also serve to strengthen the back plate 34, and for further strengthening horizontal ridges 194 are pressed or embossed inwardly at the top and bottom of the plate 34. The inward embossing prevents these ridges from blocking the flow of ambient air upward in the passage 193. A circular ridge 196 with radial spokes 197 is also embossed in the plate 34 to give added strength thereto.

Tumbler baffles

As the tumbler 76 rotates, it is desirable that damp clothing therein be well tumbled so that all surfaces may be uniformly exposed to the hot gases flowing through the chamber 28. Tumbling is enhanced if the clothing, in addition to being tumbled in a direction normal to the tumbler axis, is also circulated somewhat longitudinally. To this end a plurality of, preferably three, semi-ellipsoidal or semi-ovoid tumbling or baffle members 201 (Fig. 23, below Fig. 6) are mounted obliquely to the inner surface of the tumbler 76. The members 201 are provided with interior, downwardly extending bosses 202, which are drilled and tapped to receive mounting screws 203 from the exterior of the tumbler 76. A longitudinal, interior partition 204 serves to strengthen the baffle members 201. The oblique mounting of the tumbling members 201 tends to keep the clothes circulating longitudinally within the chamber 28.

Blower inlet

A feature of the instant invention is the provision of means for quieting the tip noise or whine that so often accompanies the operation of an air blower, such as the impeller or blower 120. The blower 120 includes the usual casing in the form of a scroll, best seen in Fig. 3, which has a generally tangential outlet passage, this being the discharge conduit or passage means 35 shown in Fig. 3. As explained hereinbefore, the inlet eye opening for the blower is shown at 147, and is located on the axis of the impeller.

In accordance with the instant invention, the means for quieting the tip hum is shown particularly in Fig. 24, and consists of forming the blower casing wall with a protruding segment 251 which extends in chordal fashion across one edge of the otherwise circular opening 147. The segment 251 is disposed adjacent the tangential outlet passage 35 in such a manner that an axial plane, represented by the line 252, extended from the axis 253 of the inlet 147 and through the leading end 254 of the segment 251, intersects the line of the outlet 35, shown at 256, substantially normally. The point 254 is referred to as the leading end of segment 251 because of its relationship to the direction of rotation of the impeller, as shown by the arrow 257.

The intersection of the plane 252 with the line 256 of the outlet may deviate from a true normal by plus or minus 8° and still produce the desired quieting of the impeller hum. That is to say, the angle shown at 258 may vary from 82° to 98° and the complementary angle 259 may correspondingly vary from 98° to 82°.

The size of the segment 251 is preferably such that it intercepts an arc of substantially 74°, as shown at 261. The arc 261 of the segment 251 may, however, be anywhere between 66° and 82° and still produce satisfactory quieting of the impeller hum.

Hair dryer

It is a feature of this invention to adapt the clothes dryer, in simple and inexpensive fashion, for use as a hair dryer. To this end an accessory is provided in the form of a casing 206 (Fig. 25) adapted to fit into the outlet chamber 152, in place of the screen basket 158. The casing 206 is generally of the same configuration as the basket 158, except that it has imperforate walls, and the back wall 207 is made slanting to streamline and more properly direct the upward flow of discharged hot gases. Like the screen basket 158, the casing 206 is provided with side flanges 208, which fit into the vent box channels 154 (Fig. 27). The forward face of the casing 206 is open, just as the forward face of the screen basket 158 is open, so that the casing 206 may receive hot gases from the discharge conduit means 35. The upper wall 209 of the casing 206 is provided with a circular outlet port surrounded by a collar 211, to which is attached one end of a flexible conduit 212. The other end of the conduit may, if desired, have a suitable form of nozzle 213.

Operation of the hair drying accessory will be explained in connection with Figs. 28 and 29. The grill 153 is tipped back. If a closure plate 167 is used, it is removed and placed to one side. The screen basket 158 is also removed and placed to one side. Through the top opening of the vent box 151, the casing 206 is then inserted in place of the screen basket 158, leaving the flexible tube 212 projecting upward from the splash guard structure 37. The dryer is then operated in normal fashion, except that it is preferred that there be no moist clothes in the tumbler 76 at the time, because otherwise the hot gas discharged from the nozzle 213 would be laden with moisture.

As shown in Fig. 28, air enters the housing 31 through the inlet 136 where it is filtered in the filter 37. In the housing 31 the air supports combustion at the gas burner 29, and the hot products of combustion then pass upwardly through the hot gas passage or conduit means 30 and into the tumbler 76 through the aperture 134. From the tumbler 76 the hot gases are evacuated by the blower 120 and forced upwardly in the discharge conduit 35 into the casing 206 and thence through the flexible conduit 212 and out the nozzle 213. The flexibility of the conduit 212 permits the user to direct the hot gases over her head as she desires, thus drying her hair following washing thereof.

Electric heating

The present clothes dryer is readily adaptable for electric heating in place of the gas heating heretofore described. Such an adaptation is shown in Figs. 30 and 31, the former being taken along a section substantially the same as that of Fig. 7, the latter being generally similar to Fig. 3—in each case, however, showing the apparatus modified for electric heating.

To adapt the dryer for electric heating, the gas heating elements 29, 124, 144, and 146 shown in Fig. 7 are all eliminated. Across the bottom of the inside vertical conduit 126a (Fig. 30) is mounted a transverse apertured bottom plate 263 which supports an electrical fitting 264. Through the fitting 264 pass leads 266 which are connected to a helical electrical heat element 267 supported on a frame 268 mounted upright within the conduit 126a. The frame 268 includes a central or axial rod 269, the upper end of which passes through a small opening 271 in the bent-over portion 138a of the conduit 126a. A small transverse pin 272 supports the rod 269 in the portion 138a. The lower end of the rod is passed through a guide hole 273 in the bottom plate 263.

By provision of the alternative heating arrangement shown in Figs. 30 and 31 the dryer of the instant invention may be readily changed over at the time of installation to an electric powered apparatus rather than one energized by gas.

*Circuit*

The circuitry of the instant dryer will now be described with reference to Fig. 32. Terminals 214 and 215 represent the conventional plug by means of which 110 volts A. C. may be appiled to the dryer circuit. One side of the dryer circuit is connected to the terminal 214 through a suitable timer or timing switch 216, which is normally open, and which may be manually closed, closing of the switch starting a suitable clock work, so that at the end of a chosen time the switch automatically returns to its normal, open position.

Connected in series with, and energized through, the switch 216 are a cabinet lamp 217 and a germicidal lamp 218. These lamps are placed side by side immediately behind the bulkhead 41 so that their rays fall on the clothes within the tumbler 76. A glass window 219 (Fig. 6) serves to transmit the white light from the lamp 217 so as to illuminate the interior of the primary drying chamber. The germicidal or deodorizing lamp 218 is in direct communication with the chamber 28, and therefore must be enclosed or mounted within the bulkhead 41 (Fig. 3).

Also energized through the switch 216 is the drive motor 122, which has a conventional overload relay 219 in series therewith. Between the motor 122 and the switch 216 is interposed a double-throw switch 221 actuated by the door 106 of the housing 31. When the door is closed, the switch 221 is in its upper position, and completes the circuit to the motor 122. Opening of the door drops the switch to its lower position de-energizing the motor circuit. Closing of the lower contact completes a shunt circuit to the lamps 217 and 218 around the timer switch 216, so that whether the timer 216 is actuated or not, the lamps always go on when the door 106 is opened. In addition the lamps are on when the dryer is in operation, i. e., when the timer switch 216 is closed, thus insuring that the germicidal lamp 218 will be on to sterilize the clothes. The lamps 217 and 218 are placed in series because the germicidal lamp 218 requires a ballast, which is conveniently provided by the iluminated incandescent lamp 217.

The control circuit for the dryer burners is connected into the motor circuit at 222, betwen the motor 122 and the relay 219. Thus the control circuit also receives the benefit of the protection of the overload relay 219. From the point 222 the circuit leads to a pilot solenoid 223, which is returned to the terminal 215 through the contacts 224 of a warp switch, and through a return conductor 226. The pilot solenoid 223, when energized, opens a valve in the gas line leading to the burner pilot 144.

In shunt with the pilot solenoid 223 is one side of a double-throw relay switch 227 connected in series with the primary winding 228 of a transformer 229, the secondary winding 231 of which serves to energize an ignition heater or heating element 232. The heating element 232 is disposed in close proximity to the mouth of the pilot burner 144, so as to ignite gas emerging therefrom.

Physically in close proximity to the flame of the pilot burner 144 is a thermocouple 233, which energizes the coil 234 of the relay 227. After the thermocouple 233 has been sufficiently heated by the pilot flame, the relay 227 is actuated to open the circuit to the igniter 232, and to close a circuit to a main solenoid 236 which operates a valve in the gas line feeding the main burner 29.

In series with the main solenoid 236 is a normally closed safety thermostat switch 237, which is physically in communication with the tumbler just above the aperture 134, where the hot gases enter the primary drying chamber 28. Thus if for some reason the gases entering the tumbler should become dangerously hot, the circuit to the main solenoid 236 is opened, closing the valve to the main burner 29.

Also in series with the main solenoid 236 are a pair of shunt connected temperature-selection, thermally-operated switches 238 and 239. Physically, these switches are mounted close together in the discharge conduit or passage means 35 (Fig. 3) so as to be responsive to the temperature of the gases withdrawn from the tumbler 76. A manually operated double-throw, double-pole, switch 241 permits either the thermostat 238 or the thermostat 239 to be inserted in the main solenoid circuit. One of these thermostats is set for a higher temperature than is the other, so that by operating the switch 241 the user may determine the average temperature which he wishes to exist in the tumbler 76. The switch 241 is operated by two buttons located side by side in the left side of the splash guard structure 37, as may be seen in Fig. 1. The actuating knob for the timer 216 matches in appearance the two buttons 241, and is placed symmetrically on the right-hand side of the splash guard 37.

In parallel with the control circuit are a pair of indicator lamps 242 and 243 mounted physically behind the translucent plastic buttons that operate the switch 241, these buttons being the portions shown in Fig. 1. The lights 242 and 243 are optionally energized also by the double-throw switch 241 to indicate which of the two thermostats, 238 or 239, is connected in the main solenoid circuit.

The warp switch 224 is actuated by the heat from a resistor 244, which is connected in shunt with the series connected elements 228 and 224. If the relay 227 remains in its "cold" position too long after the circuit has been energized, heat from the resistor 244 causes the contacts 224 to open, thus de-energizing the pilot solenoid 223 and the ignition heater 232.

*Operation*

Operation of the dryer is substantially as follows: The user first opens the door 106 to place damp clothing in the tumbler 76. This causes the switch 221 to move to its lower position, energizing the lamp 217 so that the interior of the tumbler is illuminated. After the clothes have been placed in the tumbler, the door 106 is closed, re-actuating the switch 221 to its upper position.

The timer switch 216 is then turned to a desired time setting, closing the switch and energizing the dryer circuit. The switch 216 remains closed for a predetermined time, following which it is automatically opened by a small clock mechanism which is wound by the user's action in setting the timer. Closing of the timer switch 216 energizes the motor 122 to immediately effect rotation of the tumbler 76 and start a flow of air through the dryer by virtue of the impelling action of the primary blower 120. The secondary blower 174 is also set in operation to cause circulation of ambient air around the outside of the tumbler and through the secondary drying chamber 40.

Closing of the timer switch 216 also energizes the pilot solenoid 223 and the ignition heater 232. As gas flows from the pilot burner 144, it is ignited by the heater 232 and begins to heat up the thermocouple 233. Should there be something wrong with the gas line so that the pilot is not ignited, the thermocouple will not heat up and the relay 227 will remain unenergized. After a predetermined time, the heater 244 causes the warp switch 224 to open, de-energizing the igniter 232 and the solenoid 223 which closes the pilot solenoid valve. Thereafter the user must open the timer switch 216 in order to de-energize and cool the heater 244. Thus the user is given notice that something is wrong in the gas line, and an opportunity is provided to correct the trouble before again re-closing the timer 216.

Normally the pilot flame heats the thermocouple 233 within the proper time, operating the relay 227, which opens the circuit to the igniter 232 and to the warp switch heater 244. The relay 227 simultaneously closes the circuit to the main solenoid 236, which opens the main valve, causing gas to flow to the main burner 29, which is ignited by the flame at the pilot 144.

As the dryer thus operates, the main burner will be periodically shut off and on by the periodic de-energization and energization of the main solenoid 236 through operation of one or the other of the thermostat switches 238 and 239 depending on which is in the circuit. In this way the gases emerging from the dryer are maintained at one of two preset temperatures, maintenance of these temperatures being determined by operation of either the switch 238 or 239, which are selected by the switch 241.

For some very delicate fabrics it is desirable that they be dried at simply room air temperature. To this end a manual switch 246 placed in the control circuit permits operation of the motor 122 while de-energizing the burner portions of the circuit. Thus ambient air may be circulated through the tumbler 76 and through the tray 169 without any added heating.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims.

What is claimed is:

1. In a clothes dryer comprising a substantially orthogonal housing, a circular clothes tumbler rotatably mounted within said housing with its axis substantially horizontal, the front face of said tumbler being open and being disposed adjacent the front wall of said housing, said housing having a door in the front wall thereof by means of which clothes may be placed in said tumbler, a drive motor mounted to said housing with its shaft paralleling the tumbler axis, one end of the drive motor shaft extending rearwardly and having a pulley thereon, belt means coupling said pulley to said tumbler to rotate said tumbler, the other end of said motor shaft extending forwardly from said motor, a blower casing disposed around the forward end of said motor shaft, an air impeller secured to the forward end of said motor shaft and rotatable within said blower casing, said blower casing having a screened inlet admitting air thereto, and an outlet directed generally tangentially with respect to said tumbler, whereby air is caused to circulate around the outside of said tumbler within said housing, said housing having a top hinged at the back thereof which may be opened to give access to the region within said housing above said tumbler, a tray having a perforated floor disposed in said housing immediately above said tumbler, said floor being depressed into the segmental areas of said housing at each side of said tumbler, the interior of said tray between its floor and said housing top constituting a secondary drying chamber, said air from said blower circulating around said tumbler and through said secondary chamber.

2. In a clothes dryer comprising a substantially orthogonal housing, a circular clothes tumbler rotatably mounted within said housing with its axis substantially horizontal, the front face of said tumbler being open and being disposed adjacent the front wall of said housing, said housing having a door in the front wall thereof by means of which clothes may be placed in said tumbler, a burner in said housing, hot gas passage means for conveying hot gases from the burner to the tumbler, discharge passage means for withdrawing hot gases from the tumbler and discharging the same outside of the housing, the combination of a tray disposed in said housing immediately above said tumbler and having a floor depressed into the segmental areas of said housing at each side of said tumbler, said housing having a top hinged at the back thereof which may be opened to give access to said tray from above said housing, the region between the floor of said tray and said housing top constituting a secondary drying chamber, passage means for conveying warm gases into said secondary drying chamber, passage means for withdrawing gases from said secondary drying chamber, and means for causing passage of warm gases through said secondary drying chamber.

3. In a dryer comprising a housing, a tumbler rotatably mounted in the housing, a burner in the housing, hot gas passage means for conveying hot gases from the burner to the tumbler, and discharge passage means for withdrawing hot gases from the tumbler and discharging the same outside of the housing, the combination of a partition in said housing above said tumbler forming an upper drying chamber above the tumbler, passage means in said partition permitting entrance of warm air currents from the housing into the chamber, passage means in said partition permitting withdrawal of warm air currents from said chamber, access means above said tumbler giving access to said chamber for the deposition and removal of articles to be dried, and means in said housing for circulating warm air around said tumbler and through said chamber.

4. Apparatus according to claim 3 wherein said warm air circulating means comprises a blower mounted in said housing externally of said tumbler, said blower having an outlet directed upwardly substantially tangentially with respect to the exterior of said tumbler.

5. In a clothes dryer adapted to be placed with its back against a room wall, and comprising in combination a substantially orthogonal housing, a drying chamber adapted to receive clothes to be dried, the combination of venting structure in the form of an elongate splash guard structure extending across the rear of said housing at the top thereof, and extending above the level of said housing top, the interior of said splash guard structure forming a venting region along the top of the dryer at the back thereof, discharge conduit means for evacuating gases from said drying chamber, said discharge conduit means terminating substantially centrally in the splash guard structure, said structure being open at the top immediately above the termination of said discharge conduit means, the back of said splash guard structure also having an opening communicating with said discharge conduit means, and the two side ends of said splash guard structure also having openings, said openings being optionally closeable by closure plates, whereby evacuated gases may be vented either upwardly, rearwardly, or sidewardly from said splash guard structure, the regions of said splash guard structure at each side of said discharge conduit being adapted to receive, optionally, a side conduit for conveying hot gases to either side of said splash guard structure.

6. In a clothes drier, a cabinet, a clothes tumbling drum rotatably journaled within said cabinet, an opening in the front wall of said cabinet confronting a clothes receiving opening in said drum and affording access to the interior of said drum for the placing of clothes therein for drying by tumbling while heated air is being circulated therethrough, said cabinet also having a clothes receiving opening in the top thereof having an upwardly opening cover closing said opening, and a tray spaced beneath said top and confronting the opening therein and extending over said clothes tumbling drum, and forming a receptacle so spaced with respect to said drum as to accommodate the circulation of heated air over said tray effected by rotational movement of said drum for the drying of delicate clothes on said tray.

7. In a clothes dryer having a cabinet, a rotatable clothes tumbling drum in said cabinet adapted to receive clothes therein for drying while tumbling, means for imparting heat within said cabinet, and means for circulating hot air from said heat means into said drum and out of said drum, the combination comprising: a tray having perforate openings in the floor thereof rigidly mounted within said cabinet and above said drum for receiving delicate clothes to be dried without tumbling, heat from said heat means passing through the perforate openings in the floor of the tray into said tray aided by rotation of said drum, and means for rotating the drum thereby to dry delicate clothes on said tray.

8. A dryer adapted to be placed with its back against a room wall and comprising in combination a housing having a drying chamber therein, burner means in said housing, hot gas passage means for conveying hot gases from said burner to said drying chamber, discharge passage means for evacuating gases from said drying chamber, said discharge passage means terminating at the upper rear portion of said housing in an upwardly directed conduit, whereby heated gases discharged from the dryer are directed upwardly beside the room wall against which the dryer is placed with its back against the wall, said housing having a substantially flat back wall disposed parallel to the room wall, said back wall having outward vertical ridges preventing said housing from being placed flush against the room wall, and thereby leaving a vertical passage between the room wall and said back wall through which ambient air may be drawn upwardly by the action of the heated gases discharged from said vertical conduit thereby preventing the room wall from becoming unduly hot because of the presence of the dryer adjacent thereto, said vertical ridges being outwardly embossed from said back wall, and wherein the lower extremities of said ridges stop appreciably short of the bottom of said housing, whereby cooling air may be drawn in sidewardly underneath said ridges, said back wall also including inwardly pressed horizontal ridges to give horizontal strength to said back wall.

References Cited in the file of this patent
UNITED STATES PATENTS

| | | |
|---|---|---|
| 1,548,218 | Sieben | Aug. 4, 1925 |
| 1,629,921 | Mansfield | May 24, 1927 |
| 1,752,797 | Hutchinson | Apr. 1, 1930 |
| 1,767,157 | Steele | June 24, 1930 |
| 2,160,666 | McMahon | May 30, 1939 |
| 2,183,079 | Kropp | Dec. 12, 1939 |
| 2,349,668 | Marker et al. | May 23, 1944 |
| 2,372,790 | Morgenstern | Apr. 3, 1945 |
| 2,480,929 | Hyman | Sept. 6, 1949 |
| 2,498,172 | Mintner et al. | Feb. 21, 1950 |
| 2,498,478 | Balph | Feb. 21, 1950 |
| 2,506,516 | Moore | May 2, 1950 |
| 2,543,579 | Kauffmann | Feb. 27, 1951 |
| 2,547,238 | Tremblay | Apr. 3, 1951 |
| 2,586,794 | Douglas | Feb. 26, 1952 |
| 2,604,312 | Andersen et al. | July 22, 1952 |
| 2,611,976 | Reiter et al. | Sept. 30, 1952 |
| 2,617,203 | Murray | Nov. 11, 1952 |
| 2,619,734 | Geldof et al. | Dec. 2, 1952 |
| 2,619,736 | Geldhof | Dec. 2, 1952 |
| 2,628,432 | Morrison | Feb. 17, 1953 |
| 2,631,069 | Starr | Mar. 10, 1953 |
| 2,635,354 | Geldof et al. | Apr. 21, 1953 |
| 2,648,142 | Shapter | Aug. 11, 1953 |
| 2,651,509 | Hyman | Sept. 8, 1953 |
| 2,675,628 | O'Neil | Apr. 20, 1954 |
| 2,687,578 | Richterkessing | Aug. 31, 1954 |

OTHER REFERENCES

New Automatic Speed Queen Clothes Drier, Form #467, Speed Queen Corporation, Ripon, Wisconsin, 4 pages. Undated but accompanying Repair Manual is marked—prices effective January 1, 1953.